United States Patent
Karadayi

(10) Patent No.: US 10,671,974 B2
(45) Date of Patent: Jun. 2, 2020

(54) ROBOT INTERACTION WITH A TELE-PRESENCE SYSTEM

(71) Applicant: Sony Interactive Entertainment LLC, San Mateo, CA (US)

(72) Inventor: Yeliz Karadayi, San Jose, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 246 days.

(21) Appl. No.: 15/866,358

(22) Filed: Jan. 9, 2018

(65) Prior Publication Data

US 2019/0213550 A1  Jul. 11, 2019

(51) Int. Cl.
*G06K 9/00* (2006.01)
*G06Q 10/10* (2012.01)
(Continued)

(52) U.S. Cl.
CPC .......... *G06Q 10/103* (2013.01); *B25J 9/0003* (2013.01); *G06F 3/013* (2013.01);
(Continued)

(58) Field of Classification Search
CPC ............. G06K 9/00771; G06K 9/6202; G06K 9/00221; G06K 9/00335; G06K 9/00369; G06K 9/627; G06K 9/00718; G06K 9/6256; G06K 9/62; G06F 16/2264; G06F 16/9024; G06F 3/0346; G06F 3/011; G06F 3/0304; G06N 3/04; G06N 3/08; G06N 3/02;
(Continued)

(56) References Cited

U.S. PATENT DOCUMENTS 7,435,019 B2  10/2008  Lee
8,325,214 B2 * 12/2012 Hildreth ................. H04N 7/147
                                                       348/14.03
(Continued)

OTHER PUBLICATIONS

Karadayi, Yeliz, "Hub and Detachable Head for Tele-Presence System," U.S. Appl. No. 15/887,574, dated Feb. 2, 2018, Specification, Claims, Abstract, and Drawings, 45 pages.
(Continued)

*Primary Examiner* — Duy M Dang
(74) *Attorney, Agent, or Firm* — Carr & Ferrell LLP

(57) ABSTRACT

The disclosure provides methods and systems for spatial communication in a tele-presence system. In particular, the present technology provides human-robot interaction that allows users to feel a stronger sense of successful communication with a tele-presence system. Various embodiments of the present technology facilitate spatial communication between users via the tele-presence system, including communicating body language, spatial awareness, and improved information display, with a tele-presence device including a camera system and a hub. The methods and systems may include determining a user input, such as a gesture, indicative of an object, and detecting and tracking the object. The methods and systems may further include transmitting at least one control signal to one or more servo motors coupled to the camera system, the at least one control signal configured to reposition the camera system such that the detected object is kept within boundaries of a video signal.

20 Claims, 13 Drawing Sheets

(51) Int. Cl.
*H04N 7/15* (2006.01)
*G06F 3/01* (2006.01)
*B25J 9/00* (2006.01)
*G06T 7/70* (2017.01)
*H04N 7/14* (2006.01)

(52) U.S. Cl.
CPC ......... *G06F 3/017* (2013.01); *G06K 9/00288* (2013.01); *G06T 7/70* (2017.01); *H04N 7/142* (2013.01); *H04N 7/147* (2013.01); *H04N 7/15* (2013.01); *G06T 2200/04* (2013.01)

(58) Field of Classification Search
CPC ...... H04N 7/181; H04N 5/2226; G08C 17/00; G08C 17/02; A63F 13/213; A63F 13/24; A63F 13/426; A63F 13/428; A63F 13/655; A63F 13/00; G06T 7/73; G08B 13/196
See application file for complete search history.

(56) References Cited

U.S. PATENT DOCUMENTS

| | | |
|---|---|---|
| 8,325,229 B2 | 12/2012 | Jones et al. |
| 10,425,616 B2 * | 9/2019 | Karadayi ............... H04N 7/142 |
| 2006/0269278 A1 | 11/2006 | Kenoyer et al. |
| 2014/0267019 A1 * | 9/2014 | Kuzmin ............. G06K 9/00355 |
| | | 345/156 |
| 2019/0246063 A1 | 8/2019 | Karadayi |

OTHER PUBLICATIONS

Nicewarner et al. Vision-Guided Grasping of a Strut for Truss Structure Assembly. In Intelligent Robotic Systems for Space Exploration, 1992. Proceedings. Fourth Annual Conference on, pp. 86-93. IEEE, 1992.

* cited by examiner

ROBOT INTERACTION WITH A TELE-PRESENCE SYSTEM

FIELD

The present technology relates generally to tele-presence systems, and more particularly to providing robotic interactions and spatial communication with a tele-presence system.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Tele-presence systems attempt to imitate face-to-face communication between two or more remote users. Conventionally, services such as video conferencing have become widely popular forms of communicating over vast distances. Current tele-presence systems typically work though a two-dimensional screen which displays a live video signal of each user. Face-to-face communication, however, includes a plurality of various forms of engagement, including body language and spatial awareness in addition to conveying verbal and otherwise non-verbal information. While users may wish to communicate by pointing at things, gesturing, or talking with their hands, it is difficult to validate or communicate such forms of communication through traditional two-dimensional systems.

Accordingly, there is a need for a tele-presence system which allows users to feel a stronger sense of successful communication and to communicate spatially.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to methods and systems for spatial communication in a tele-presence system. Exemplary methods may include receiving a video signal from a camera system, determining, based on the video signal, a user input indicative of an object, detecting, based on the user input, the object present in the video signal, tracking the detected object, the tracking including determining a position of the detected object within boundaries of the video signal, determining the detected object is within a predetermined threshold distance of a boundary of the video signal, and transmitting at least one control signal to one or more servo motors coupled to the camera system, the at least one control signal configured to reposition the camera system such that the detected object is kept within the boundaries of the video signal.

In further embodiments, an exemplary tele-presence device may include a camera system and a hub communicatively coupled to the camera system. The hub may include one or more servo motors, at least one processor, and a memory for storing processor-executable codes, wherein the at least one processor is configured to implement the following operations upon executing the processor-executable codes: receiving a video signal from the camera system, determining, based on the video signal, a user input indicative of an object, detecting, based on the user input, the object present in the video signal, tracking the detected object, the tracking including determining a position of the detected object within boundaries of the video signal, determining the detected object is within a predetermined threshold distance of a boundary of the video signal, and transmitting at least one control signal to the one or more servo motors, the at least one control signal configured to reposition the camera system such that the detected object is kept within the boundaries of the video signal.

In various embodiments, the present disclosure is directed to a non-transitory processor-readable medium having instructions stored thereon, which when executed by one or more processors, cause the one or more processors to implement a method for spatial communication in a tele-presence system. The method may include receiving a video signal from a camera system, determining, based on the video signal, a user input indicative of an object, detecting, based on the user input, the object present in the video signal, tracking the detected object, the tracking including determining a position of the detected object within boundaries of the video signal, determining the detected object is within a predetermined threshold distance of a boundary of the video signal, and transmitting at least one control signal to one or more servo motors coupled to the camera system, the at least one control signal configured to reposition the camera system such that the detected object is kept within the boundaries of the video signal.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1:
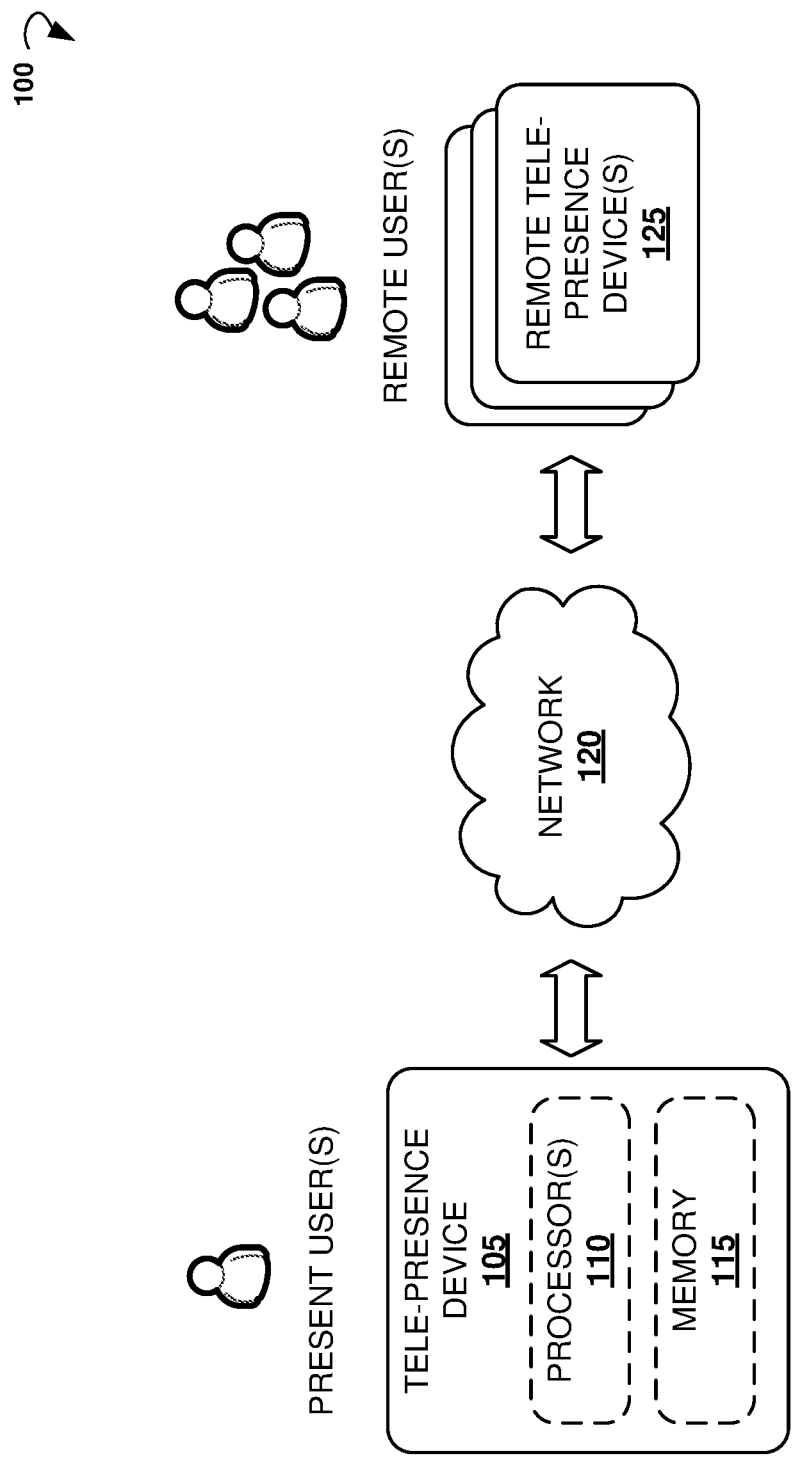
FIG. 1 shows an example system architecture of a tele-presence system, accordance with some embodiments of the present disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

In general, various embodiments of the present disclosure are directed to systems and methods for robot interactions with a tele-presence system. In particular, the present technology provides human-robot interaction that allows users to feel a stronger sense of successful communication with a tele-presence system. Various embodiments of the present technology facilitate spatial communication between users via the tele-presence system, including but not limited to communicating body language, spatial awareness, and improved information display.

In some embodiments, the present technology may include a robotic system, otherwise referred to as a "tele-presence device," having a camera system, otherwise referred to as a "head," coupled to a hub, otherwise referred to as a "body." An example robotic system is provided in related U.S. patent application Ser. No. 15/887,574 entitled "Hub and Detachable Head for Tele-Presence System," filed Feb. 2, 2018, which is incorporated by reference herein for all purposes. The hub may include one or more servo motors which, in response to a received control signal, are configured to rotate and/or translate the camera system. It is to be understood, however, that the systems and methods provided herein may be used with any suitable robotic and/or tele-presence system.

The robotic system may track a discernable image and reposition the camera system such that the discernable image is within the visible view of the camera system. Similarly, the robotic system may recognize and determine when the discernable image is no longer present in the visible view, such as when the object is out of view of the camera system or is no longer present. In some embodiments, the discernable image is a predetermined image, such as a QR code or other suitably recognizable image. In other embodiments, the discernable image is isolated and determined from a frame of video data from the camera system.

The robotic system may implement object recognition to recognize one or more objects present in the video data. Furthermore, in some embodiments the robotic system recognizes body gestures of the first user, or performs gaze-tracking of one or more users. Based on the recognized body gesture or gaze, the robotic system may determine one of the one or more objects is associated with the body gesture or gaze. For example, the first user may point to a nearby object. The robotic system may determine that the first user has pointed, and further determine that the body gesture of pointing is associated with the nearby object. The robotic system may then generate a discernable image of the object and track the discernable image.

In particular, the view available to the robotic system is the view that is presented to the remote user on the other end of the tele-presence system. It is to be understood that the video signal or data of the camera system may be streamed or otherwise transmitted to one or more remote tele-presence devices, personal computers, tablets, mobile devices, or other suitable computing devices. The robotic system facilitates communicating to the present user that the remote user is looking at and is able to view the identified object by rotating the camera system. By rotating the camera system such that it is always facing the identified object, the robotic system provides a co-gazing type of body language that requires no additional verbal communication. The body language of the robotic system ensures that the present user understands that the remote user is able to view the identified object.

In a further embodiment, the robotic system may further include a projector. In such embodiments, the robotic system may facilitate visually tracking an object or area, sending the visual information to a remote tele-presence device, as well as projecting media onto the object or area. The media may be determined by either the robotic system or the remote tele-presence device. For example, the first user may gesture to a physical prototype of a product and use real-time projection mapping, such as projecting aesthetics onto the physical prototype to visualize a proposed design in real-time allowing for direct collaboration. In a further example, the robotic system may be used to share a view of a physical whiteboard with remote users. The robotic system may then project an overlay or virtual whiteboard onto the physical whiteboard, such that the remote users may collaboratively see and manipulate the physical whiteboard.

In another further embodiment, the robotic system provides saving spaces based on profiles. The hub, or body, of the robotic system may be associated with a particular space, such as a home, office, or other suitable location. Likewise, the camera system, or head, may be associated with a particular person or team. In response to the camera system coupling to the hub, the robotic system may load a predetermined set of applications based on the particular space and the particular person or team. An identifier and profile may be stored and associated with the camera system, which is associated with the particular person or team.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a cellular phone, smart phone, computer (e.g., a desktop computer, tablet computer, laptop computer), game console, handheld gaming device, and so forth.

The following detailed description of embodiments includes references to the accompanying drawings, which form a part of the detailed description. Note, the features, structures, or characteristics of embodiments described herein may be combined in any suitable manner in one or more implementations. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The term "or" is used to refer to a nonexclusive "or," such that "A or B" includes "A but not B," "B but not A," and "A and B," unless otherwise indicated.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture of a tele-presence system 100 for facilitating personal and spatial communication between one or more present users and one or more remote users. In various embodiments, the tele-presence system 100 includes a tele-presence device 105 and one or more remote tele-presence devices 125. The tele-presence device 105 includes one or more processors 110 and memory 115. In one example, the tele-presence device 105 is a robotic system. In some embodiments, the one or more remote tele-presence devices 125 are robotic systems, personal computers, tablets, mobile devices, or other suitable computing devices.

The aforementioned elements of the tele-presence system 100 are operatively coupled to one another via one or more communication networks 120, as shown in FIG. 1. Communication networks 120 can be any of wired or wireless (radio or optical) communication methods. For example, communication networks 120 include the Internet, cellular networks, Ethernet-based networks, satellite networks, or other suitable networks. Moreover, the communication networks 120 may include any number of intermediary servers or other processors which may perform some or all of the processing done by the tele-presence devices described herein.

Figure 2:
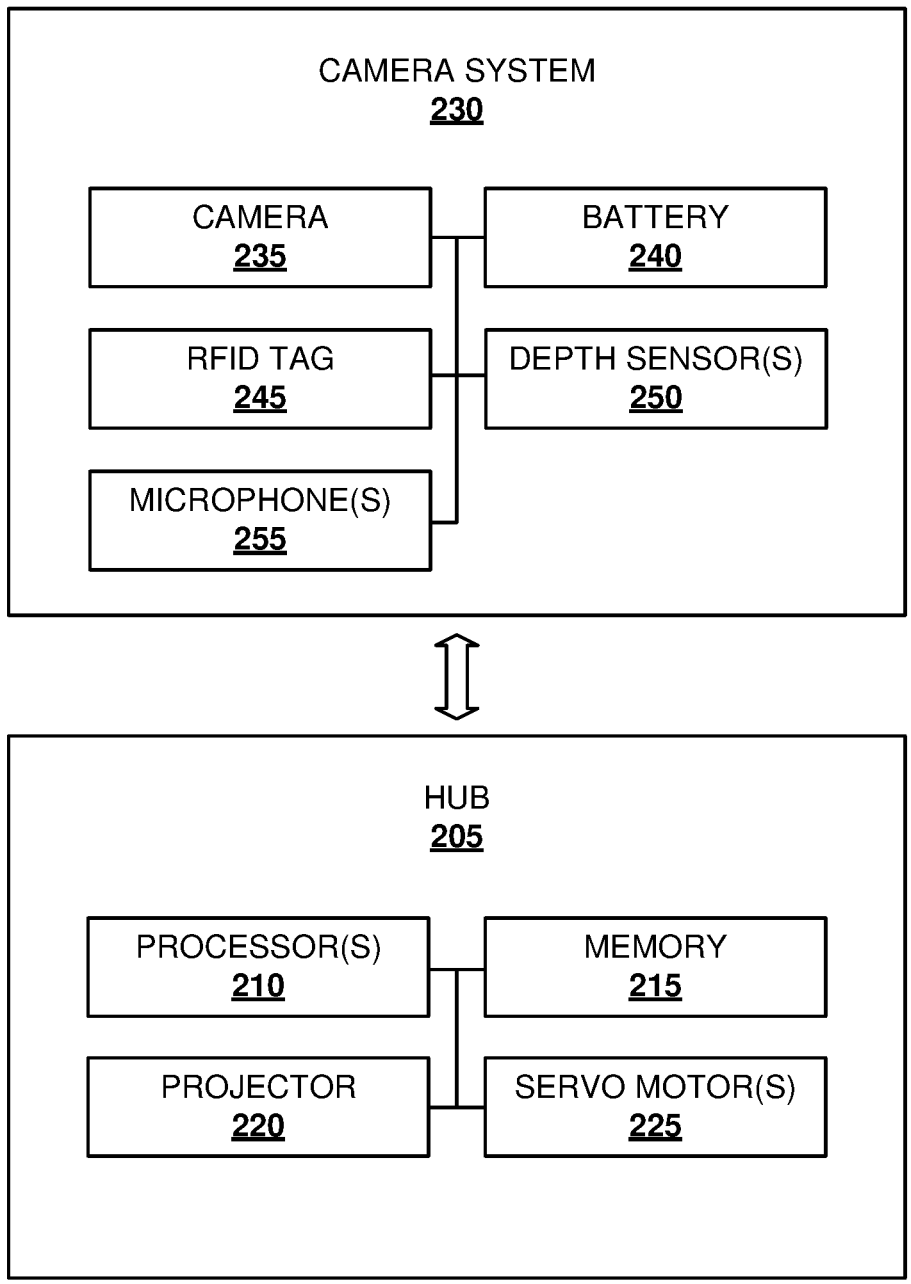
FIG. 2 illustrates an example system architecture of a tele-presence device, in accordance with some embodiments of the present disclosure.

FIG. 2 illustrates an example system architecture of a tele-presence device 200. In some embodiments, the tele-presence device 200 includes a hub 205 and a camera system 230. The hub 205 and camera system 230 may be communicatively coupled via a wired or wireless connection.

The hub 205 may have one or more processors 210, a memory 215, and one or more servo motors 225. The hub 205 may optionally include a projector 220. The one or more processors 210 may be communicatively coupled to the memory 215, projector 220, servo motors 225, and the camera system 235. In various embodiments, the servo motors 225 are configured to operatively position and/or orient the camera system 230. It is to be understood that other types of actuators may similarly be used in place of servo motors 225, such as linear actuators, stepper motors, and the like.

In one or more embodiments, the camera system 230 includes a camera 235, a battery 240, an RFID tag 245, and one or more depth sensors 250. The camera 235 may be configured to record a video signal and transmit the video signal to the hub 205. Likewise, the one or more depth sensors 250 may be configured to generate depth data indicative of the distance from the camera 235 of a physical environment, and to transmit the depth data to the hub 205. The RFID tag 245 may transmit a user identifier associated with a user or a group of users, as will be described in greater detail herein. It is to be understood that the camera system 230 may be comprised by any combination or subset of the above recited elements.

It is to be understood that the elements of the tele-presence device 200 shown in FIG. 2 may be disposed within and coupled to the hub 205, camera system 230, or both. For example, while the projector 220 is shown as a part of the hub 205, in some embodiments the projector 220 is integrated into the camera system 230. Likewise, while the depth sensor 250 and microphone 255 are shown as a part of the camera system 230, in some embodiments the depth sensor 250 and/or microphone 255 are integrated into the hub 205.

Figure 3:
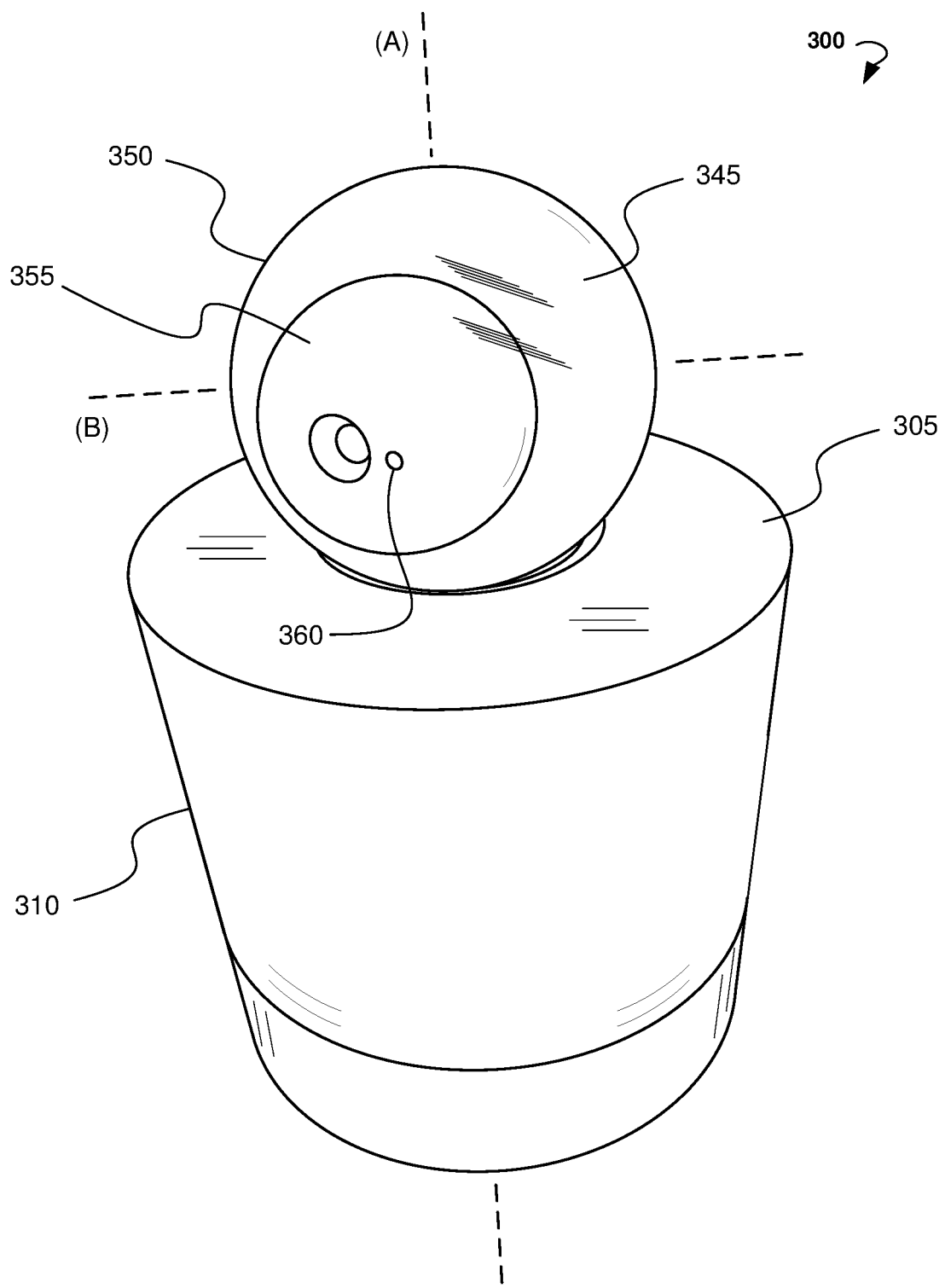
FIGS. 3-4 are front perspective views of an exemplary tele-presence device having a hub and a camera system, in accordance with some embodiments of the present disclosure.
Figure 4:
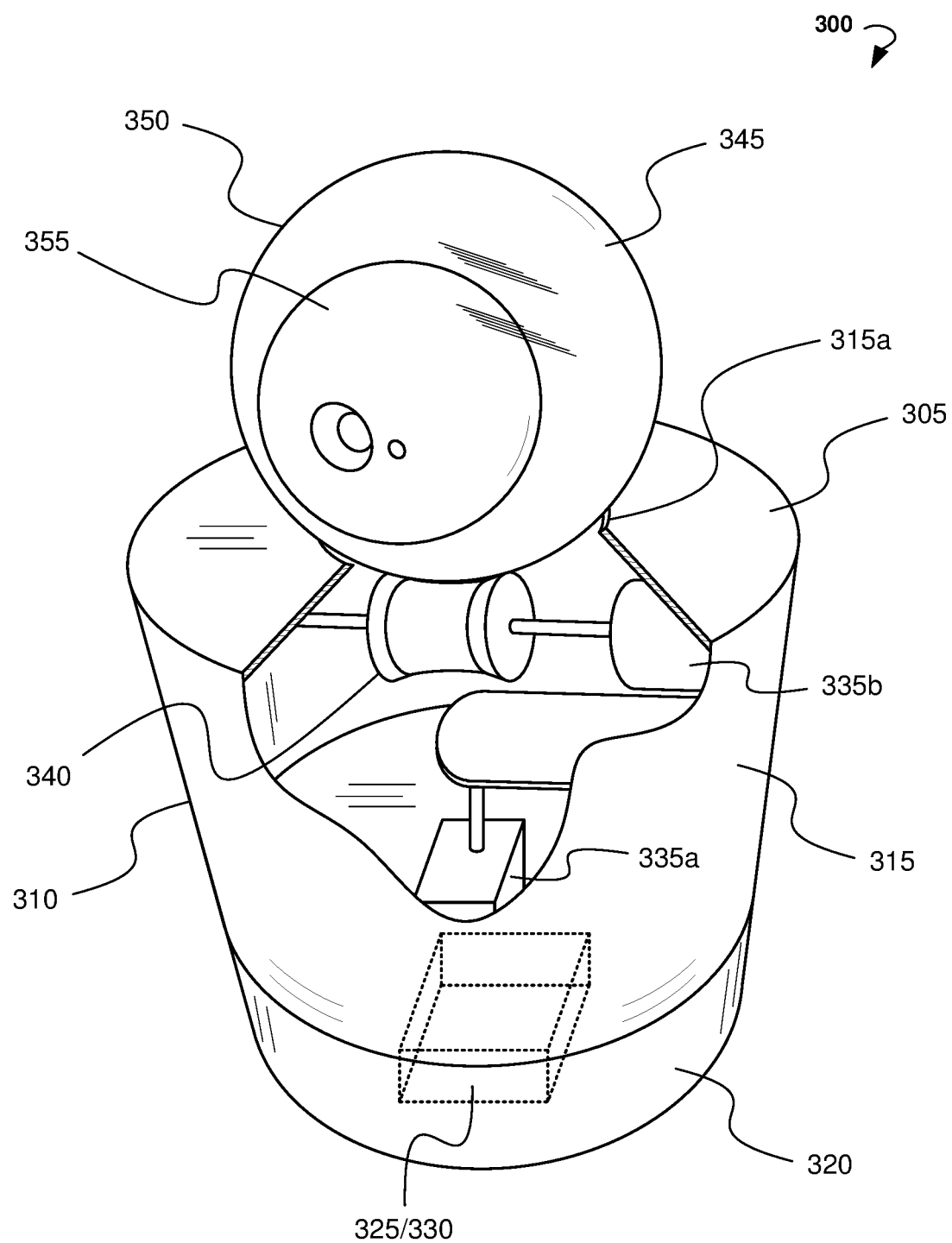
Figure 5:
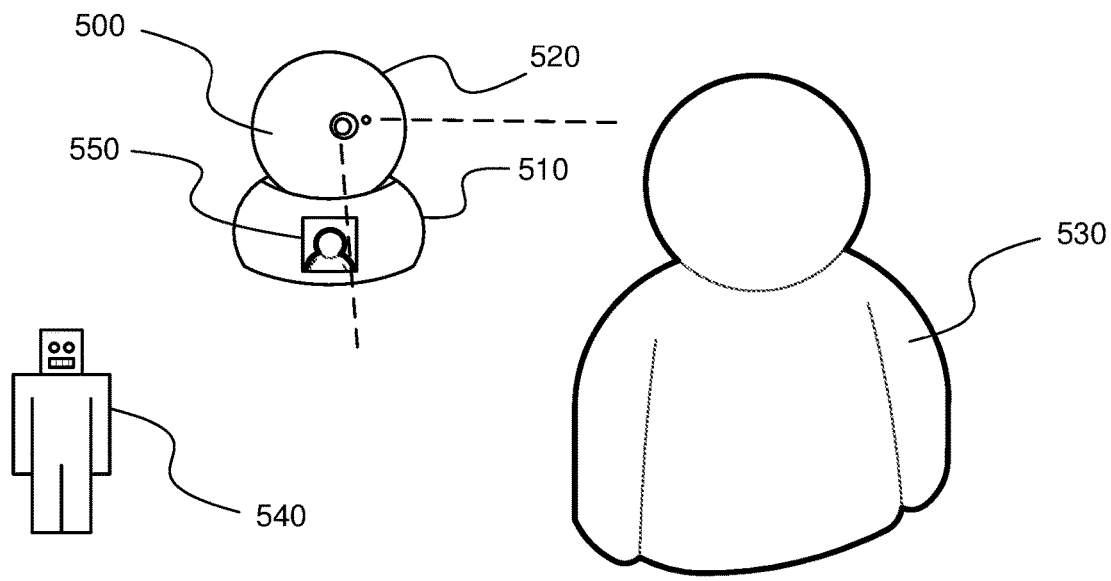
FIGS. 5-8 depict another exemplary tele-presence device performing a method for spatial communication, in accordance with some embodiments of the present disclosure.

FIGS. 3-4 are front perspective view of an exemplary tele-presence device 300 having a hub 305 and a camera system 345, in accordance with some embodiments of the present disclosure. The hub 305 includes a housing 310, one or more processors and memory (collectively labeled 325/330), and servo motors 335a, 335b. The housing 310 may have an upper housing 315 and a lower housing 320. In certain embodiments, the upper housing 315 is rotatably coupled to the lower housing 320.

The servo motors 335a, 335b are configured to rotate the camera system 345. In some exemplary embodiments, servo motor 335a is coupled to and rotates the upper housing 315. Aperture 315a of the upper housing 315 securely receives the camera system 345 such that the camera system 345 and the upper housing 315 are rotationally and frictionally engaged (i.e., when the upper housing 315 rotates, the camera system 345 rotates along a first axis (A)). In various embodiments, servo motor 335b is coupled to and rotates a spindle 340. The camera system 345 may be frictionally engaged with the spindle 340 such that, when the spindle 340 rotates, the camera system 345 rotates along a second axis (B) orthogonal to the first axis (A).

Advantageously, the camera system 345 may be removed from the hub 310 by simply lifting the camera system 345 out of the aperture 315a. In various embodiments, the camera system 345 has no direct attachments to the hub 310, but is rotated and otherwise moved through frictional engagement. The camera system 345 may also be communicatively coupled to other hubs by placing the camera system 345 onto the hubs, such as in the aperture 315a. The camera system 345 may include a housing 350, a camera 355, and a depth sensor 360.

The tele-presence device 300 is described in further detail in related U.S. patent application Ser. No. 15/887,574 entitled "Hub and Detachable Head for Tele-Presence System," filed Feb. 2, 2018, which is incorporated by reference herein for all purposes.

FIGS. 5-8 depict another exemplary tele-presence device 500 performing a method for spatial communication, in accordance with some embodiments of the present disclosure. The tele-presence device 500 may include, for example, a camera system 520 and a hub 510. The camera system 520 may operatively rotate with respect to the hub 510. The hub 510 may further include a display 550 configured to display a video signal from a remote user. A user 530 may interact with the tele-presence device 500 to video chat with the remote user and, for example, to show the remote user an object 540.

Figure 6:
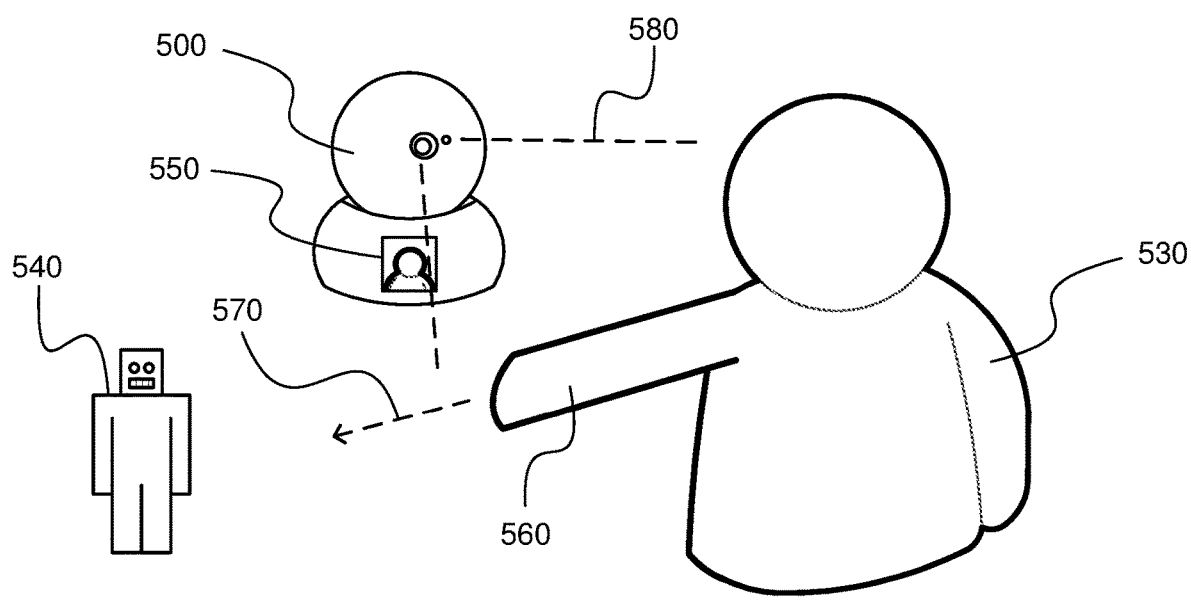

FIG. 6 shows the user 530 performing a gesture 560 to indicate selection of the object 540. The tele-presence device 500 detects the gesture 560 through a gesture recognition process and determines a direction 570 of the gesture 560. In some embodiments, the tele-presence device 500 analyzes frames of the video signal to determine a two-dimensional direction vector. In other embodiments, the tele-presence device 500 may use depth data from one or more depth sensors to render or otherwise create a three-dimensional model of the physical environment. The tele-presence device 500 may then recognize the present user and determine, through one or more gesture recognition processes, that the user has performed a gesture 560. Based on the three-dimensional model, the tele-presence device may determine a three-dimensional direction vector indicative of the direction 570 of the gesture 560. Any suitable gesture recognition process may be used, including but not limited to pattern recognition, skeletal modeling, etc.

In various embodiments, the tele-presence device 500 performs object detection to determine the object 540 indicative of the direction 570. In some embodiments, the tele-presence device 500 may, before or after the gesture 560 is performed, detect one or more objects within a view 580 of the camera system 520. The tele-presence device 500 may then determine that one object of the one or more objects is in the direction 570 of the gesture 560, and is the subject of the gesture 560. It is to be understood that one or more methods may be implemented to perform the object detection, including but not limited to image segmentation, blob analysis, edge detection, color processing, or other suitable object detection algorithm or combination thereof.

Figure 7:
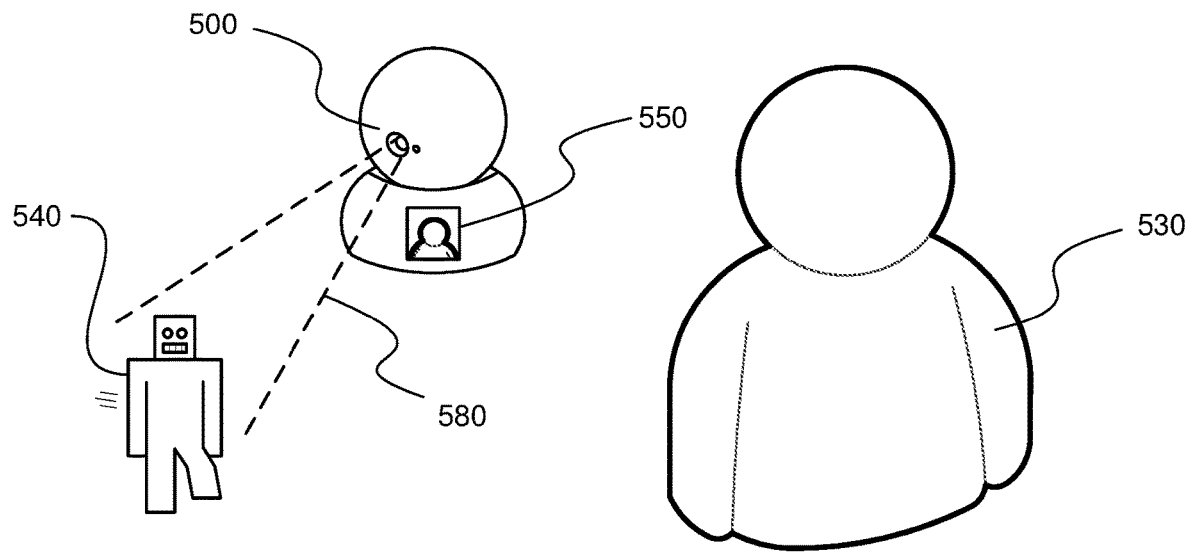

In some embodiments, if none of the one or more objects within the view 580 are in the direction 570 of the gesture 560, the tele-presence device 500 may be configured to redirect the view 580 in the direction 570 such that the view 580 includes the object 540. The tele-presence device 500 may redirect the view 580 by operatively rotating the camera system 520, as shown in FIGS. 6-7. Once the object 540 is detected in the view 580, the tele-presence device 500 may stop rotating the camera system 520, and begin tracking the object 540.

Since the view 580 is visible by the remote user, the rotation of the camera system 520 facilitates the remote user being able to see the indicated object 540. Likewise, the physical movement of the camera system 520 communicates to the present user that the remote user is currently viewing the object 540, without necessarily having to see the video signal the remote user is viewing or receiving verbal feedback from the remote user that, in fact, she or he is able to see the object 540.

Figure 8:
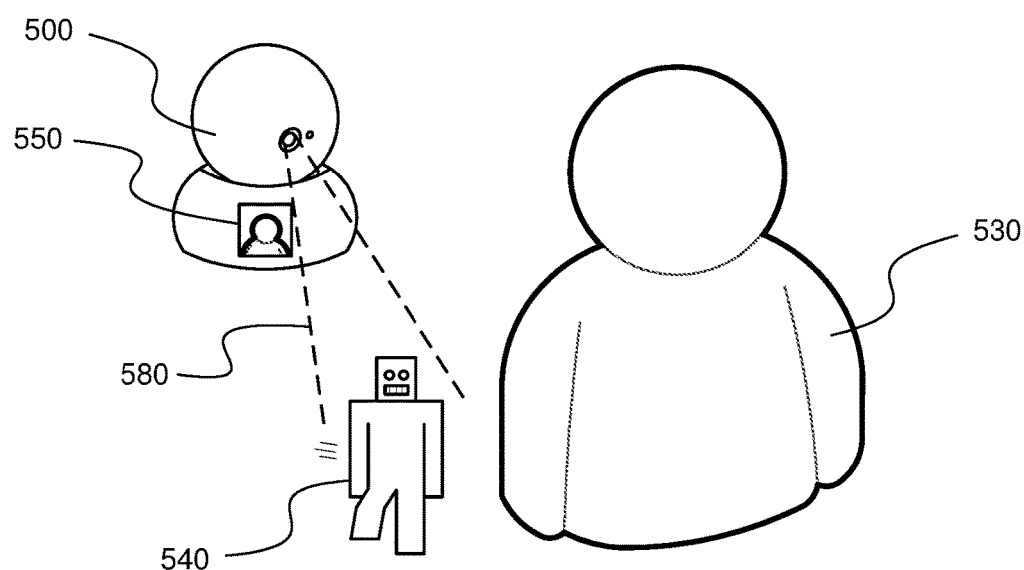

FIGS. 7-8 illustrate the tracking and recognition of the object 540 by the tele-presence device 500. The tele-presence device 500 performs object recognition on the object 540. One or more object recognition algorithms may be used, including but not limited to deep learning, machine learning, neural networks, edge matching, template matching, or other suitable method. In some embodiments, once the object 540 is detected, the tele-presence device 500 determines one or more features of the object 540 from a current frame of the video signal. In further frames of the video signal, the tele-presence device 500 may match the one or more determined features to the further frame to determine the presence and location of the object 540 within the frame.

In certain embodiments, the tele-presence device 500 centers the object 540 within the view 580 based on the determined location. For example, the tele-presence device 500 may perform object recognition on each further frame, or a subset of each further frame, to update the location of the object 540 within the frame or view 580. In response to movement of the object 540 (or a change of location of the object 540 within the view 580), the tele-presence device 500 rotates, or otherwise repositions and reorients, the camera system 520 such that the object 540 is centered in the view 580 of the video signal.

Figure 9:
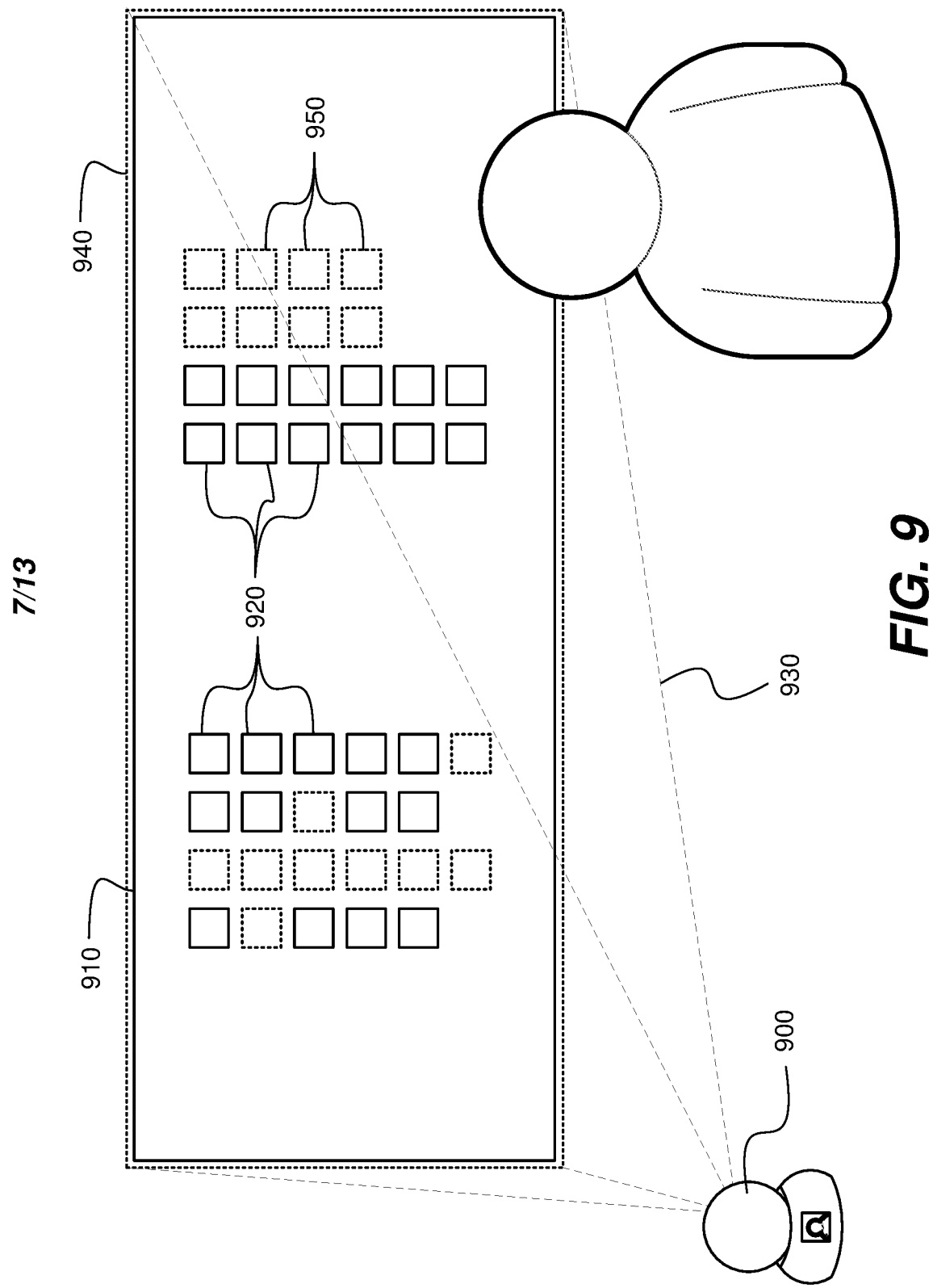
FIG. 9 shows an example of interactive projection mapping using the exemplary tele-presence device having a projector, in accordance with some embodiments of the present disclosure.

FIG. 9 shows an example of interactive projection mapping using an exemplary tele-presence device 900 having a projector with a projection 930. In general, interactive project mapping includes projecting media, including one or more images, video, text, and the like, onto a physical surface or area. In some embodiments disclosed herein, a camera system of the tele-presence device 900 has a view which encompasses the projection 930 of the projector. As such, a remote user viewing the video signal captured by the camera system may project, via the projector, media onto the visible surface.

Interactive projection mapping may include, for example, projecting a virtual whiteboard overlay 940 on top of a physical whiteboard 910 or other workspace. In this way, users may share the physical whiteboard 910 with remote users, while simultaneously allowing the remote users to collaborate and project their virtual whiteboard overlay 940, which may include additional notes, designs, and the like, onto the physical whiteboard 910. For example, the physical whiteboard 910 may include a plurality of physical notes 920, and the virtual whiteboard overlay 940 may include a plurality of projected notes 950. Since the virtual whiteboard overlay 940 is projected over the physical whiteboard 910, both the present user and the remote users view a combined whiteboard space in which both the present user and the remote users may collaborate and interact with the same space.

In some embodiments, the tele-presence device 900 is coupled to a tablet, or other suitable computing device, of the remote user. The remote user may interact with the tablet to manipulate the projection. The tablet may display the view of the video signal captured by the camera system such that interactions on the tablet are reflected in real-time via a feedback loop. For example, the feedback loop may include receiving user input via a touch-screen display of the tablet showing the displayed video signal, generating media based on the user input, transmitting the media to be projected to the tele-presence device 900, projecting the media onto the physical surface, capturing the change in the physical surface via the camera system, and transmitting the video signal to the tablet.

Figure 10:
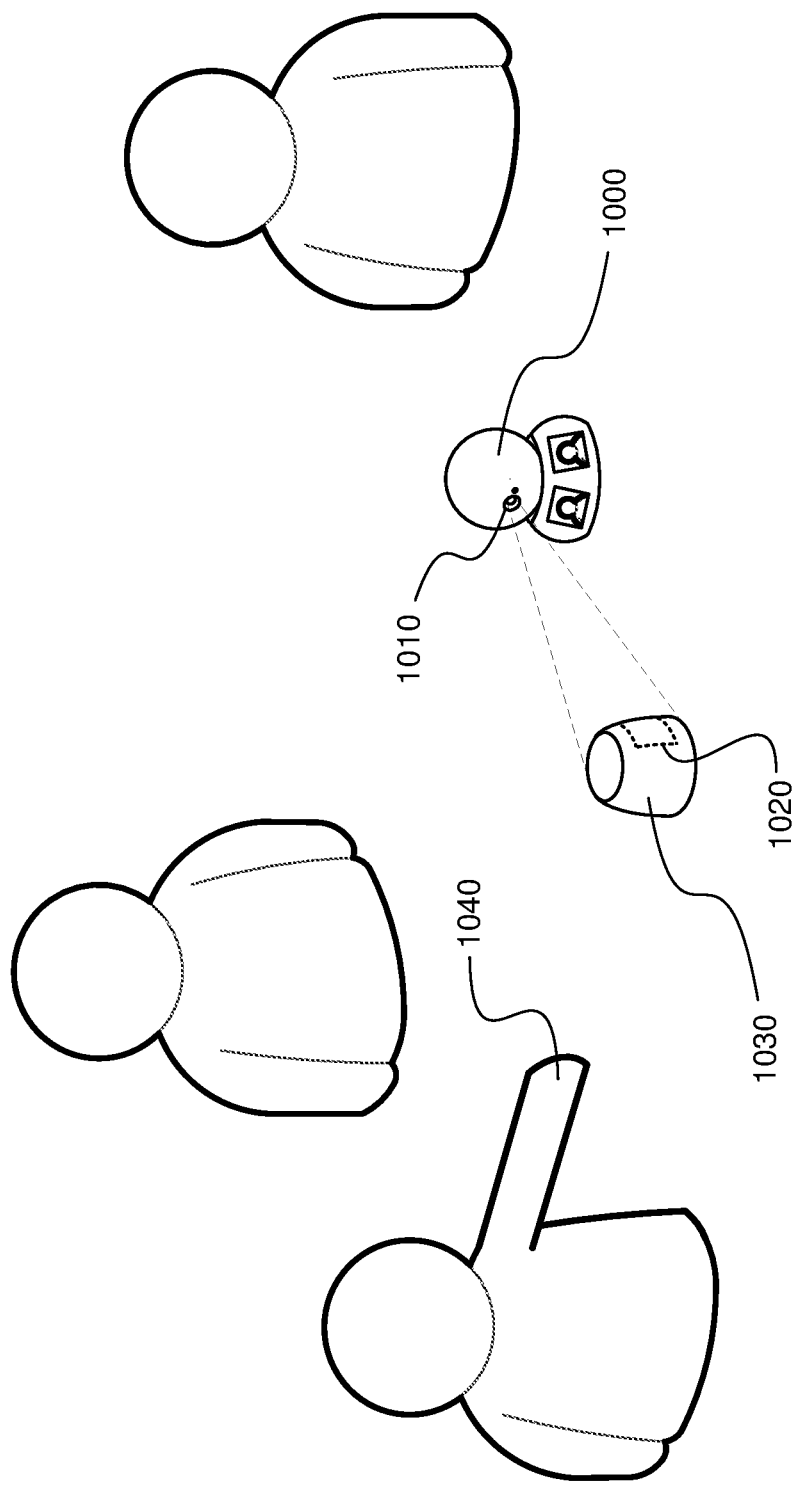
FIG. 10 illustrates another example of interactive projection mapping using the exemplary tele-presence device, in accordance with some embodiments of the present disclosure.

FIG. 10 illustrates another example of interactive projection mapping using a tele-presence device 1000 having a projector 1010, the interactive projection mapping including, for example, projecting an aesthetic design 1020 or skins onto a physical prototype 1030. The tele-presence device 1000 may identify a gesture 1040 and, based on the identification, identify and track the physical prototype 1030 using suitable methods described herein. In addition, the tele-presence device 1000 may project media onto the physical prototype 1030 such that, if the physical prototype 1030 moves, the tele-presence device 1000 would follow and continue projecting the media onto the physical prototype 1030 accordingly. In this way, a group of users, both present and remote, may visually see how the physical prototype 1030 would appear with the aesthetic design 1020, and may further draw or otherwise manipulate the projected media in real time, allowing for direct collaboration between users.

Figure 11:
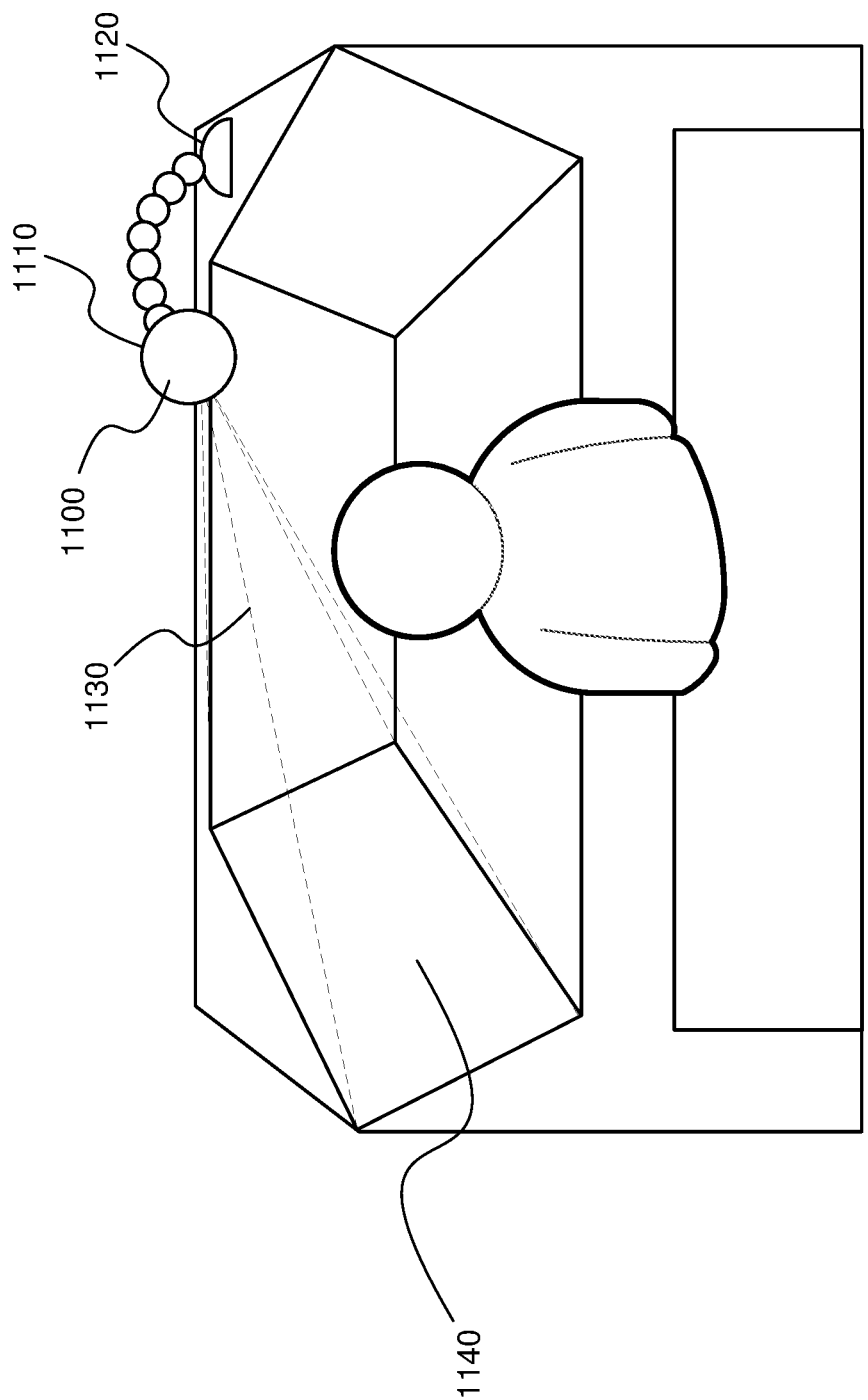
FIG. 11 depicts projecting saved spaces using the exemplary tele-presence device, in accordance with some embodiments of the present disclosure.

FIG. 11 depicts projecting saved spaces using an exemplary tele-presence device 1100 having a camera system 1110 and hub 1120. The camera system 1110 may be associated with a user identifier, the user identifier being associated with a particular user or group of users. For example, the camera system 1110 may have the identifier stored in memory or may include an RFID tag which transmits the identifier. Moreover, the hub 1120 may be associated with a space identifier, the space identifier being associated with a particular location such as home, office, or the like. In response to the camera system 1110 communicatively coupling to the hub 1120, one or more processors coupled to the hub 1120 may receive the user identifier, match a profile stored in memory to the user identifier and the space identifier, determine a predetermined set of applications based on the profile, and run the predetermined set of applications. The one or more processors may transmit a display signal to a coupled display, or to the camera system 1110 which may display a projection 1130 having the display signal onto a workspace 1140, such as a desk, wall, or any other suitable surface.

For example, a user may place the camera system 1110 on a hub at home. The home hub receives the user identifier from the camera system 1110, the home hub having its own space identifier associated with the user's home. In response to the camera system 1110 being coupled to the home hub, the home hub matches the user identifier and the space identifier to a profile, and loads a set of applications and/or files based on the profile. The user may then remove the camera system 1110 from the home head, and instead couple the camera system 1110 to the hub 1120, which may be associated with the user's office, as described above.

Additionally, in one or more embodiments the tele-presence device 1100 may include one or more smart assistance features. For example, the tele-presence device 1100 may receive, from a microphone, an acoustic signal. The acoustic signal may include, for example, discussion at a meeting, meeting requests, etc. The tele-presence device may process, using natural language processing or the like, the acoustic signal to generate information which may include a dictation of the acoustic signal, such as notes from the meeting, time and place of the meeting, etc. Based on the information, the tele-presence device 1100 may store the notes in memory or create a calendar invite based on the meeting request. In some embodiments, the smart assistance features facilitate brainstorming sessions by determining a search query from a received acoustic signal, transmitting the search query to a search engine, receiving one or more search results, and projecting the search results via the projection 1130 (or similarly the projection 930 in FIG. 9).

Figure 12:
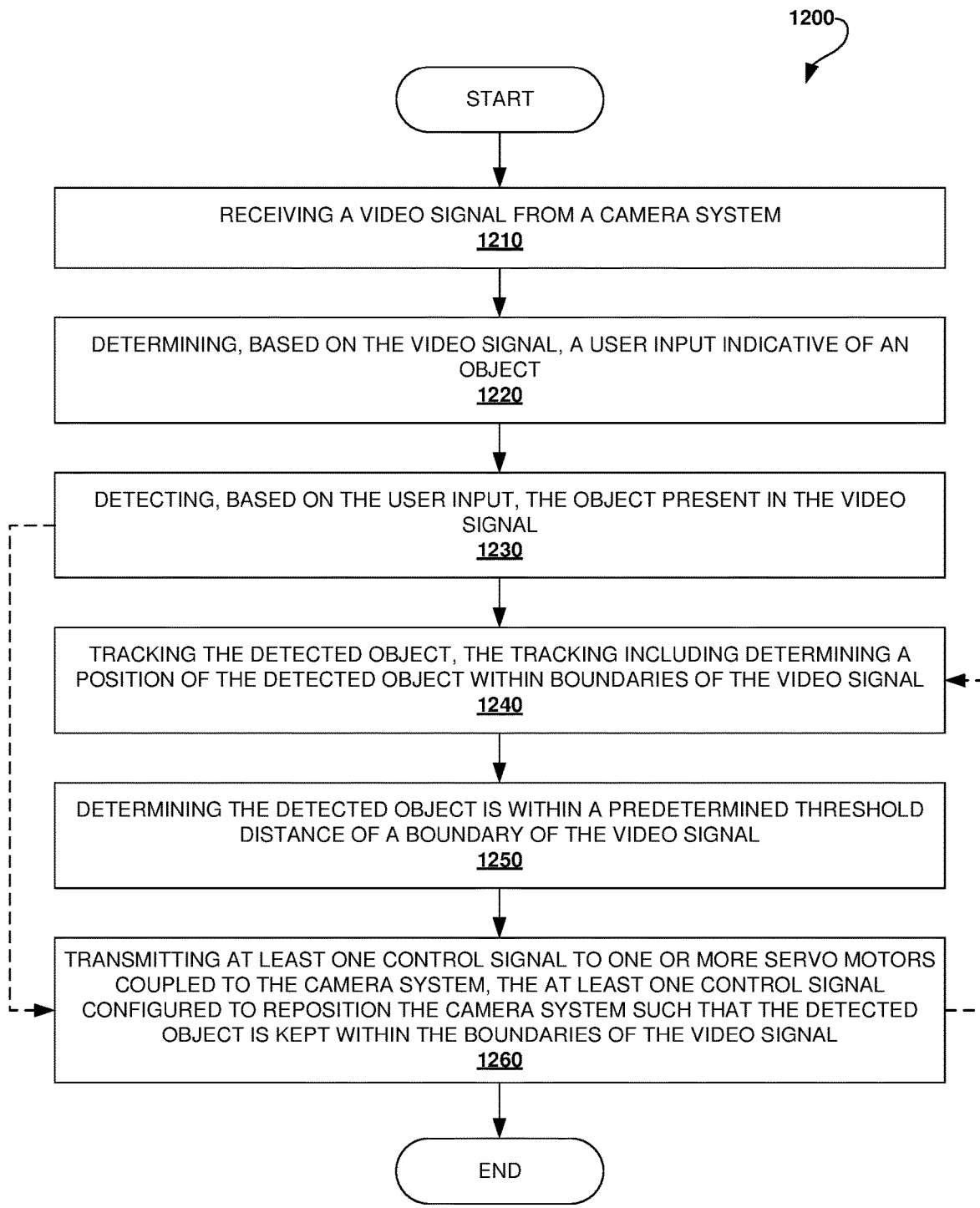
FIG. 12 is a flow chart showing an exemplary method for spatial communication in a tele-presence system, in accordance with some embodiments of the present disclosure.

FIG. 12 is a flow chart showing an exemplary method 1200 for spatial communication in a tele-presence system, according to an example embodiment. Method 1200 can be performed by processing logic that includes hardware (e.g. decision-making logic, dedicated logic, programmable logic, application-specific integrated circuit), software (such as software run on a general-purpose computer system or dedicated machine), or a combination of both. In one example embodiment, the processing logic refers to one or more elements the tele-presence systems and/or tele-presence devices shown in FIGS. 1-11.

Operations of method 1200 recited below can be implemented in an order different than described and shown in FIG. 12. Moreover, the method 1200 may have additional operations not shown herein, but which can be evident to those skilled in the art from the present disclosure. Method 1200 may also have fewer operations than shown in FIG. 12 and described below.

The method 1200 may commence in block 1210 with receiving, by one or more processors of a tele-presence device, a video signal from a camera system. The video signal can be received from one or more of the camera systems described herein.

In block 1220, the method 1200 may include determining, based on the video signal, a user input indicative of an object. The object may be a physical object. In various embodiments, the user input includes, but is not limited to, a gesture, a gaze, facial tracking, a predetermined object profile or image, acoustic signal, or other suitable user input. For example, the user input may be determined from a user pointing to a particular object. The determining may further include detecting the gesture of the user through a gesture recognition process. In a further example, the user input may be determined from a group of users gazing at the particular object. In certain embodiments, one or more features may be identified, based on the determined gesture or gaze, that are associated with a direction.

In some embodiments, the determining the user input includes analyzing frames of the video signal to determine a two-dimensional direction vector. In other embodiments, method 1200 may include receiving depth data from one or more depth sensors to render a three-dimensional model of the physical environment. The method 1200 may then include recognizing the present user, determining, through one or more gesture recognition processes, that the user has performed a gesture, and determining a three-dimensional direction vector indicative of the direction of the gesture based on the three-dimensional model.

In block 1230, the method 1200 may proceed with detecting, based on the user input, the object present in the video signal. The detecting may include performing image segmentation, blob analysis, edge detection, color processing, or other suitable object detection algorithm or combination thereof. In other embodiments, the method 1200 may detect the object based on the received depth data from the one or more depth sensors and the rendered three-dimensional model.

In some embodiments, the method 1200 may be unable to detect the object, for example, if the object of the user input is outside of the range of the camera system. In response to being unable to detect the object, the method 1200 may be configured to proceed to block 1260 and to transmit at least one control signal to one or more servo motors coupled to the camera system. The at least one control signal may be configured to move the camera system in the determined direction in block 1220 to bring the object into view. The method 1200 may return to block 1230 to detect the object, and may continue to move the camera system until the object is brought into view and detected.

In block 1240, the method 1200 may include tracking the detected object, the tracking including determining a position of the detected object within boundaries of the video signal. For example, the tracking may include determining an image associated with the detected object from a frame of the video signal and matching subsets of further frames of the video signal to the image. In various embodiments, tracking the detected object includes deep learning, machine learning, neural networks, edge matching, template matching, contour and/or shape tracking, kernel-based tracking, or other suitable feature-based tracking methods.

In block 1250, the method 1200 may proceed with determining the detected object is within a predetermined threshold distance of a boundary of the video signal. The determining may include comparing a position of the object relative to the boundary of the video signal with the predetermined threshold distance and determining that a distance between the object and the boundary is less than the predetermined threshold distance.

In block 1260, the method 1200 may include transmitting at least one control signal to one or more servo motors coupled to the camera system, the at least one control signal configured to reposition the camera system such that the detected object is kept within the boundaries of the video signal. For example, if the detected object moves from a center to a left edge of the video signal, the at least one control signal may be configured to rotate the camera system to the left, thereby shifting the detected object to the right in the video signal. In certain embodiments, the at least one control signal may be configured to reposition the camera system such that the detected object is centered within the video signal. Additionally, the method 1200 may include determining a degree of rotation, such as to reposition the camera system so the detected object is centered within the video signal.

It is to be understood that the method 1200 may proceed back to step 1240 and continue to track the detected object. Furthermore, the method 1200 may be repeated, such that a subsequent user input may be determined that is indicative of a different object, in which case the method 1200 may proceed to detect the different object and track that object instead. In certain embodiments, the method 1200 may further determine another user input and stop tracking the detected object.

Figure 13:
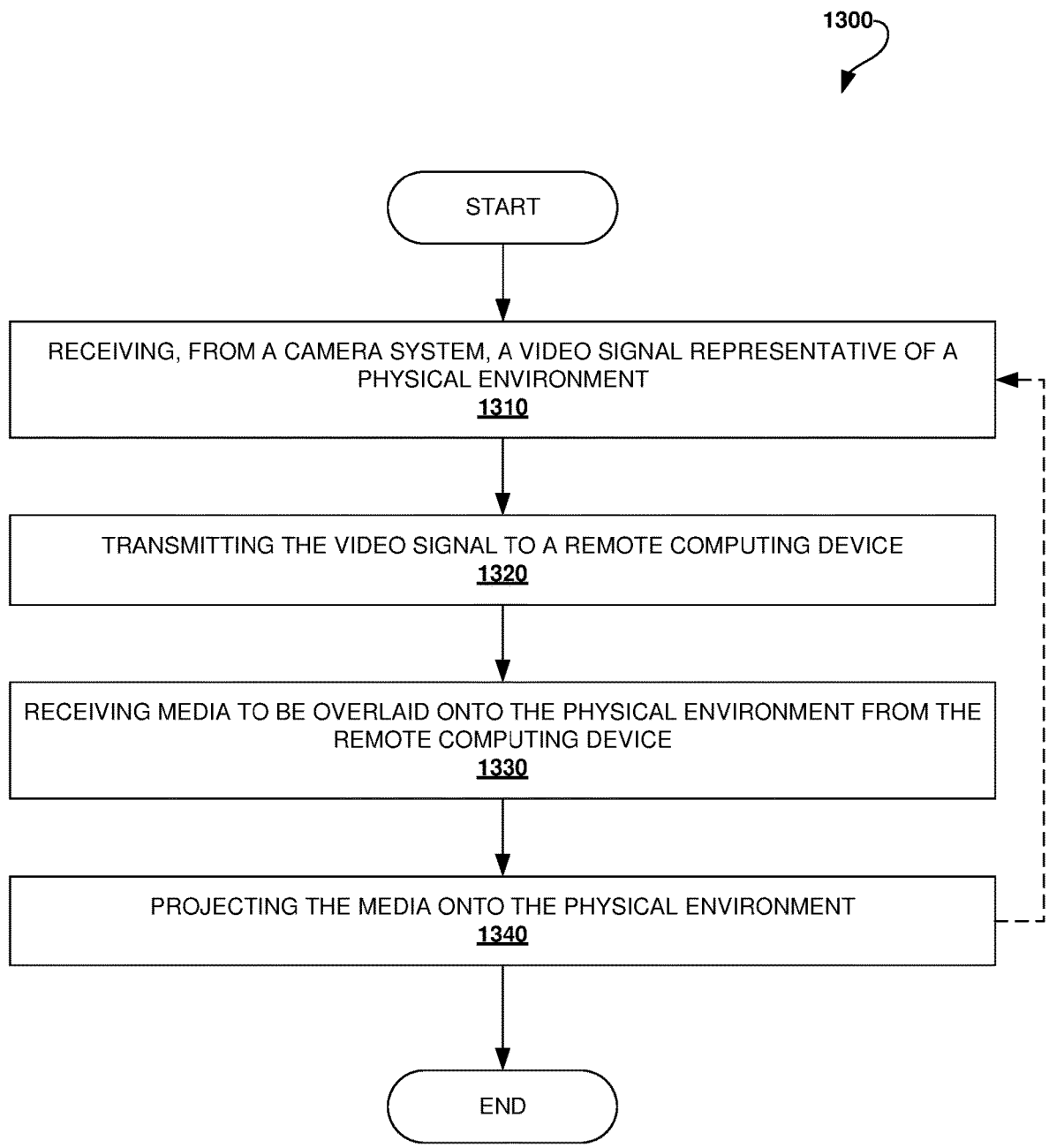
FIG. 13 is a flow chart showing an exemplary method for interactive projection mapping in a tele-presence system, in accordance with some embodiments of the present disclosure.

FIG. 13 is a flow chart showing an exemplary method 1300 for interactive projection mapping in a tele-presence system, in accordance with some embodiments of the present disclosure.

In block 1310, the method 1300 may proceed with receiving from a camera system, via one or more processors, a video signal representative of a physical environment. The method 1300 may further include, in block 1320, transmitting the video signal to a remote computing device.

In block 1330, the method 1300 may include receiving media to be overlaid onto the physical environment from the remote computing device. The remote computing device, likewise, may be configured to receive the video signal, determine one or more user input, generate media based on the one or more user input, and transmit the media to the one or more processors. In block 1340, the method 1300 may include projecting the media onto the physical environment.

It is to be understood that some or all of the method 1300 may be combined with some or all of the method 1200. For example, an object may be detected and tracked via method 1200, and media may be projected over the object which is a part of the physical environment.

Figure 14:
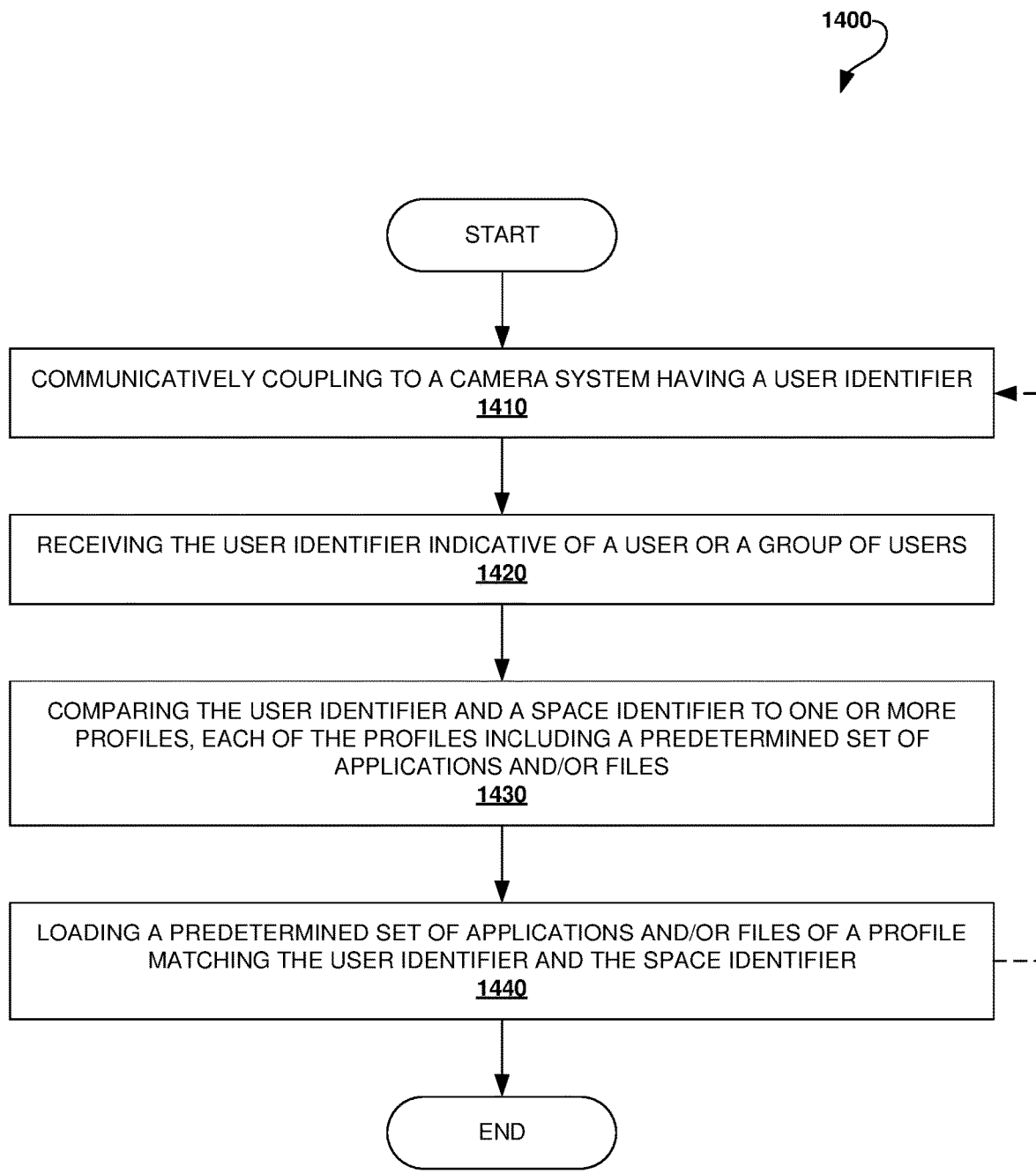
FIG. 14 is a flow chart showing an exemplary method for saving application profiles based on user and location in a tele-presence system, in accordance with some embodiments of the present disclosure.

FIG. 14 is a flow chart showing an exemplary method 1400 for saving application profiles based on user and location in a tele-presence system, in accordance with some embodiments of the present disclosure.

The method 1400 may commence in block 1410 with communicatively coupling to a camera system having a user identifier. The user identifier may be associated with a user or a group of users. In block 1420, the method may proceed with receiving the user identifier indicative of the user or the group of users.

In block 1430, the method may include comparing the user identifier and a space identifier to one or more profiles, each of the one or more profiles including a predetermined set of applications and/or files. In various embodiments, the space identifier is associated with a location of the one or more processors, such as home, office, and the like. In this way, each profile includes a particular set of applications and/or files for each user or group of users for each location. For example, a user may have desire to have a different set of applications load when she couples her camera system to a hub at the office as opposed to when she couples her camera system to a hub at home.

The method 1400 may proceed in block 1440 with loading a predetermined set of applications and/or files of a profile that matches the user identifier and the space identifier. The profile may further include a state of the applications and/or files. For example, in response to the camera system being de-coupled from the one or more processors, for example by a user removing the camera system from a hub, the one or more processors may save the state of the applications and/or files. In response to being coupled to the camera system and comparing the user identifier and space identifier to the profile, the one or more processors may load the applications and/or files in the same state as where the user left off.

It is to be understood that some or all of the method 1400 may be combined with some or all of the method 1200 and/or method 1300. For example, the method 1400 may further include projecting a display including the predetermined set of applications or files. In a particular example, a user in their workshop may desire to project circuitry information over the physical circuitry the user is working on. In response to coupling her camera system to the one or more processors, a user identifier associated with that user and a space identifier associated with that workshop may be matched to a profile including the circuitry information, which is then loaded and projected onto the physical circuitry.

Figure 15:
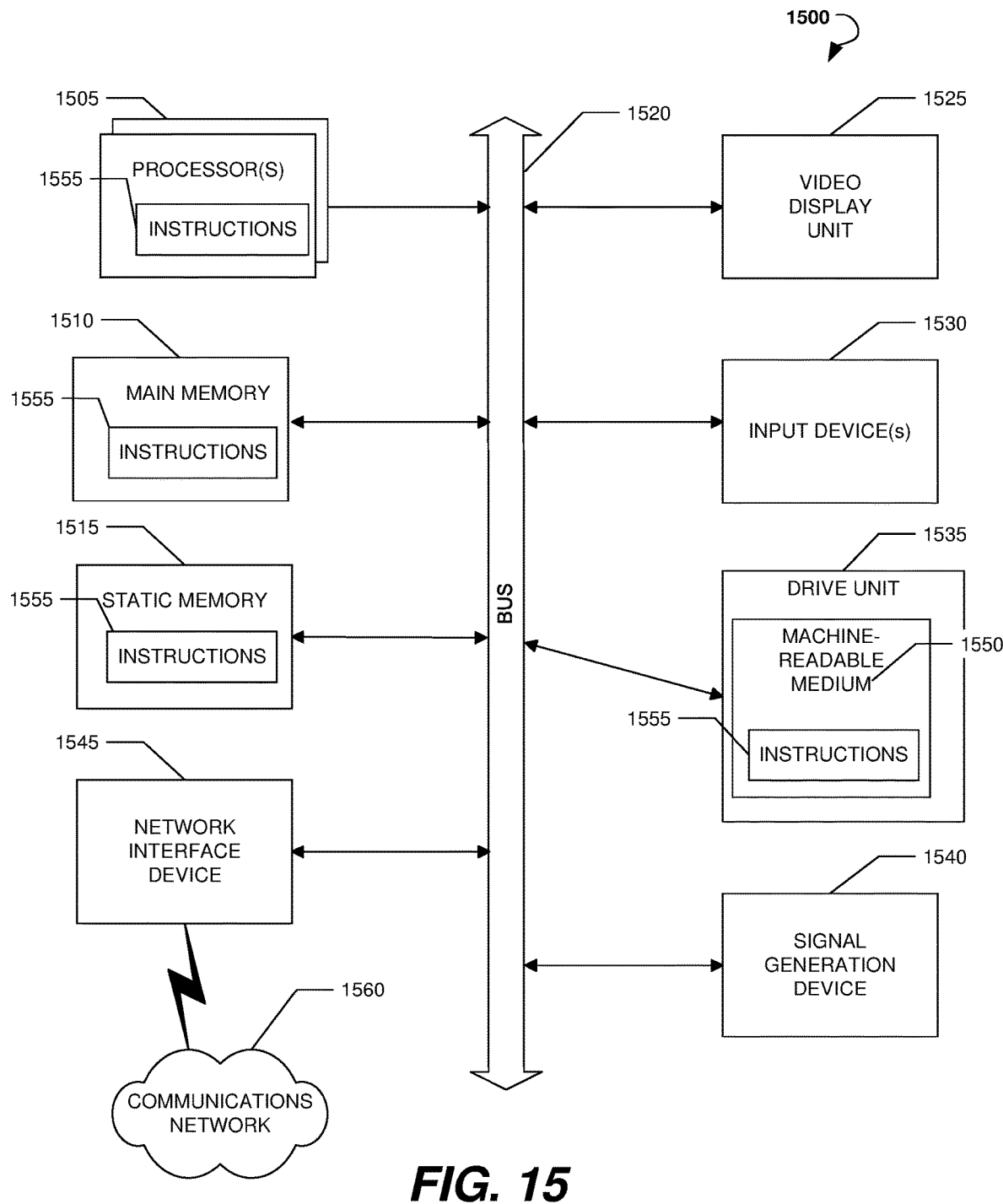
FIG. 15 is a diagrammatic representation of an example machine in the form of a computer system within which a set of instructions for the machine to perform any one or more of the methodologies discussed herein is executed.

FIG. 15 shows a diagrammatic representation of a computing device for a machine in the example electronic form of a computer system 1500, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 1500 includes a processor or multiple processors 1505 (e.g., a central processing unit (CPU), a graphics processing unit (GPU), or both), and a main memory 1510 and a static memory 1515, which communicate with each other via a bus 1520. The computer system 1500 can further include a video display unit 1525 (e.g., a liquid crystal display (LCD), organic light emitting diode (OLED) display, or a cathode ray tube (CRT)). The computer system 1500 also includes at least one input device 1530, such as an alphanumeric input device (e.g., a keyboard), a cursor control device (e.g., a mouse), a microphone, a digital camera, a video camera, and so forth. The computer system 1500 also includes a disk drive unit 1535, a signal generation device 1540 (e.g., a speaker), and a network interface device 1545.

The drive unit 1535 (also referred to as the disk drive unit 1535) includes a machine-readable medium 1550 (also referred to as a computer-readable medium 1550), which stores one or more sets of instructions and data structures (e.g., instructions 1555) embodying or utilized by any one or more of the methodologies or functions described herein. The instructions 1555 can also reside, completely or at least partially, within the main memory 1510 and/or within the processor(s) 1505 during execution thereof by the computer system 1500. The main memory 1510 and the processor(s) 1505 also constitute machine-readable media.

The instructions 1555 can further be transmitted or received over a communications network 1560 via the network interface device 1545 utilizing any one of a number of well-known transfer protocols (e.g., Hyper Text Transfer Protocol (HTTP), CAN, Serial, and Modbus). The communications network 1560 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 1550 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C #, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for modular virtual reality tracking is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for spatial communication in a tele-presence system, the method comprising:
   receiving a video signal from a camera system;
   determining, based on the video signal, a user input indicative of an object;
   detecting, based on the user input, the object present in the video signal;
   tracking the detected object, the tracking including determining a position of the detected object within boundaries of the video signal;
   determining the detected object is within a predetermined threshold distance of a boundary of the video signal; and
   transmitting at least one control signal to one or more servo motors coupled to the camera system, the at least one control signal configured to reposition the camera system such that the detected object is kept within the boundaries of the video signal.

2. The method as recited in claim 1, further comprising transmitting the video signal to a remote computing device.

3. The method as recited in claim 1, wherein the user input includes a gesture of a user.

4. The method as recited in claim 1, wherein the user input includes a gaze of one or more users.

5. The method as recited in claim 1, wherein the determining a user input indicative of an object further includes:
   in response to determining the detected object is outside of the boundaries of the video signal, transmitting at least one control signal to the one or more servo motors, the at least one control signal configured to reposition the camera system in a direction of the user input.

6. The method as recited in claim 1, further comprising transmitting media to a projector configured to project the media onto the detected object.

7. The method as recited in claim 6, further comprising receiving the media from a remote computing device.

8. The method as recited in claim 1, further comprising:
   receiving a user identifier from the camera system, the user identifier associated with a user or a group of users; and
   matching the user identifier to a profile of a plurality of profiles associated with a plurality of users.

9. The method as recited in claim 8, wherein the matching includes matching a space identifier to the profile, each profile of the plurality of profiles being associated with a particular user identifier and a particular space identifier, the space identifier associated with a physical location.

10. The method as recited in claim 8, further comprising loading a predetermined set of applications or files associated with the matched profile.

11. A tele-presence device comprising:
    a camera system; and
    a hub communicatively coupled to the camera system, the hub including one or more servo motors, the hub further including at least one processor and a memory for storing processor-executable codes, wherein the at least one processor is configured to implement the following operations upon executing the processor-executable codes:
    receiving a video signal from the camera system;
    determining, based on the video signal, a user input indicative of an object;
    detecting, based on the user input, the object present in the video signal;
    tracking the detected object, the tracking including determining a position of the detected object within boundaries of the video signal;
    determining the detected object is within a predetermined threshold distance of a boundary of the video signal; and
    transmitting at least one control signal to the one or more servo motors, the at least one control signal configured to reposition the camera system such that the detected object is kept within the boundaries of the video signal.

12. The tele-presence device as recited in claim 11, the operations further comprising transmitting the video signal to a remote computing device.

13. The tele-presence device as recited in claim 11, wherein the user input includes one or more of a gesture of a user, a gaze of one or more users, a predetermined object profile or image, and an acoustic signal.

14. The tele-presence device as recited in claim 11, wherein the determining a user input indicative of an object further includes:
    in response to determining the detected object is outside of the boundaries of the video signal, transmitting at least one control signal to the one or more servo motors, the at least one control signal configured to reposition the camera system in a direction of the user input.

15. The tele-presence device as recited in claim 11, further comprising a projector, the operations further comprising transmitting media to the projector configured to project the media onto the detected object.

16. The tele-presence device as recited in claim 15, the operations further comprising receiving the media from a remote computing device.

17. The tele-presence device as recited in claim 11, wherein the camera system is associated with a user identifier, the user identifier associated with a user or a group of users, the operations further comprising matching the user identifier to a profile of a plurality of profiles associated with a plurality of users.

18. The tele-presence device as recited in claim 17, wherein the hub is associated with a space identifier, the matching including matching the space identifier to the profile, each profile of the plurality of profiles being associated with a particular user identifier and a particular space identifier.

19. The tele-presence device as recited in claim 17, further comprising loading a predetermined set of applications or files associated with the matched profile.

20. A non-transitory processor-readable medium having instructions stored thereon, which when executed by one or more processors, cause the one or more processors to implement a method for spatial communication in a tele-presence system, the method comprising:
    receiving a video signal from a camera system;
    determining, based on the video signal, a user input indicative of an object;
    detecting, based on the user input, the object present in the video signal;
    tracking the detected object, the tracking including determining a position of the detected object within boundaries of the video signal;
    determining the detected object is within a predetermined threshold distance of a boundary of the video signal; and transmitting at least one control signal to one or more servo motors coupled to the camera system, the at least one control signal configured to reposition the camera system such that the detected object is kept within the boundaries of the video signal.

\* \* \* \* \*